(12) United States Patent
Doty et al.

(10) Patent No.: US 8,206,834 B2
(45) Date of Patent: Jun. 26, 2012

(54) MULTILAYER POLYMER STRUCTURE

(75) Inventors: James K. Doty, Alpharetta, GA (US);
Alice Weimin Liu, Alpharetta, GA (US);
Gregory Warkoski, Cumming, GA (US); Jean De Canniere, Brussels (BE)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 881 days.

(21) Appl. No.: 12/296,757

(22) PCT Filed: Apr. 13, 2007

(86) PCT No.: PCT/EP2007/053634
§ 371 (c)(1),
(2), (4) Date: Oct. 10, 2008

(87) PCT Pub. No.: WO2007/118860
PCT Pub. Date: Oct. 25, 2007

(65) Prior Publication Data
US 2009/0280282 A1    Nov. 12, 2009

Related U.S. Application Data

(60) Provisional application No. 60/792,631, filed on Apr. 18, 2006.

(51) Int. Cl.
*B32B 27/00* (2006.01)
(52) U.S. Cl. .............. 428/476.3; 428/36.9; 428/36.91; 428/135.7; 428/340; 428/474.4; 264/104; 264/173.19; 264/106; 138/140; 138/141
(58) Field of Classification Search ............... 428/36.9, 428/135.7, 476.3, 340, 474.4, 36.91; 264/104, 264/173.19, 106; 138/140, 141
See application file for complete search history.

(56) References Cited

U.S. PATENT DOCUMENTS

| 4,774,144 A | 9/1988 | Jachec et al. |
| 4,973,625 A | 11/1990 | Deyrup |
| 5,140,059 A | 8/1992 | Simoens |
| 5,147,944 A | 9/1992 | Takeda |
| 5,154,979 A | 10/1992 | Kerschbaumer et al. |

(Continued)

FOREIGN PATENT DOCUMENTS

EP    1557445 A2    7/2005

(Continued)

OTHER PUBLICATIONS

Titles of ISO test methods, 1133 and 1183.*

(Continued)

*Primary Examiner* — Michael C Miggins
(74) *Attorney, Agent, or Firm* — Oblon, Spivak, McClelland, Maier & Neustadt, L.L.P.

(57) ABSTRACT

Multilayer structure comprising at least one couple (L1-L2) of adjacent layers (L1) and (L2), wherein:
  the layer (L1) comprises at least one polymer composition (C1) comprising: (i) at least one semi-aromatic polyamide, and (ii) at least one impact modifier (I1);
  the layer (L2) comprises at least one polymer composition (C2) comprising: (i) at least one un-functionalized polyolefin (PO2); (ii) at least one functionalized polyolefin (FPO2), the functionalized polyolefin comprising functional groups chosen from carboxylic groups, their esters, their anhydrides and their salts.
Process for manufacturing such multilayer structure, which comprises co-extruding or co-blowmolding polymer compositions (C1) and (C2) so as to obtain one couple (L1-L2) of adjacent layers (L1) and (L2).
Shaped article comprising such multilayer structure and process for manufacturing the shaped article.

24 Claims, 3 Drawing Sheets

U.S. PATENT DOCUMENTS

| | | | |
|---|---|---|---|
| 5,443,874 A | 8/1995 | Tachi et al. | |
| 5,618,599 A | 4/1997 | Nulman et al. | |
| 6,667,101 B2 * | 12/2003 | Silagy et al. | 428/411.1 |
| 6,887,581 B2 | 5/2005 | Tamura et al. | |
| 2002/0098305 A1 | 7/2002 | Van Schaftingen et al. | |
| 2002/0114906 A1 | 8/2002 | Iizuka et al. | |
| 2002/0197495 A1 | 12/2002 | Tamura et al. | |
| 2003/0165699 A1 | 9/2003 | Lacroix | |
| 2004/0052911 A1 | 3/2004 | Grund et al. | |
| 2004/0071837 A1 | 4/2004 | Grund et al. | |
| 2004/0209021 A1 | 10/2004 | Shih | |
| 2005/0143519 A1 | 6/2005 | Maruo et al. | |
| 2005/0181162 A1 * | 8/2005 | Mestemacher et al. | 428/36.9 |
| 2005/0217745 A1 | 10/2005 | Watanabe et al. | |
| 2006/0094810 A1 | 5/2006 | Kim et al. | |
| 2006/0141188 A1 * | 6/2006 | Schmitz et al. | 428/35.7 |
| 2006/0280888 A1 | 12/2006 | Bersted et al. | |
| 2007/0261752 A1 | 11/2007 | McClung et al. | |
| 2008/0057244 A1 * | 3/2008 | Bushelman et al. | 428/35.7 |
| 2008/0118756 A1 | 5/2008 | Bushelman et al. | |
| 2008/0241562 A1 | 10/2008 | Bushelman et al. | |

FOREIGN PATENT DOCUMENTS

| | | |
|---|---|---|
| EP | 1757443 A1 | 2/2007 |
| JP | 5261873 A | 10/1993 |
| JP | 06047848 A | 2/1994 |
| JP | 06191296 A | 7/1994 |
| JP | 2002326326 A | 11/2002 |
| WO | WO2005017038 A2 | 2/2005 |
| WO | WO2005018892 A1 | 3/2005 |
| WO | WO2006020402 A1 | 2/2006 |
| WO | WO2006056574 A1 | 6/2006 |

OTHER PUBLICATIONS

PCT International Search Report dated Jul. 26, 2007 for International Application No. PCT/EP2007/053634 (3 p.).

* cited by examiner

Figure 1. Modular co-Extrusion Cylindrical Die
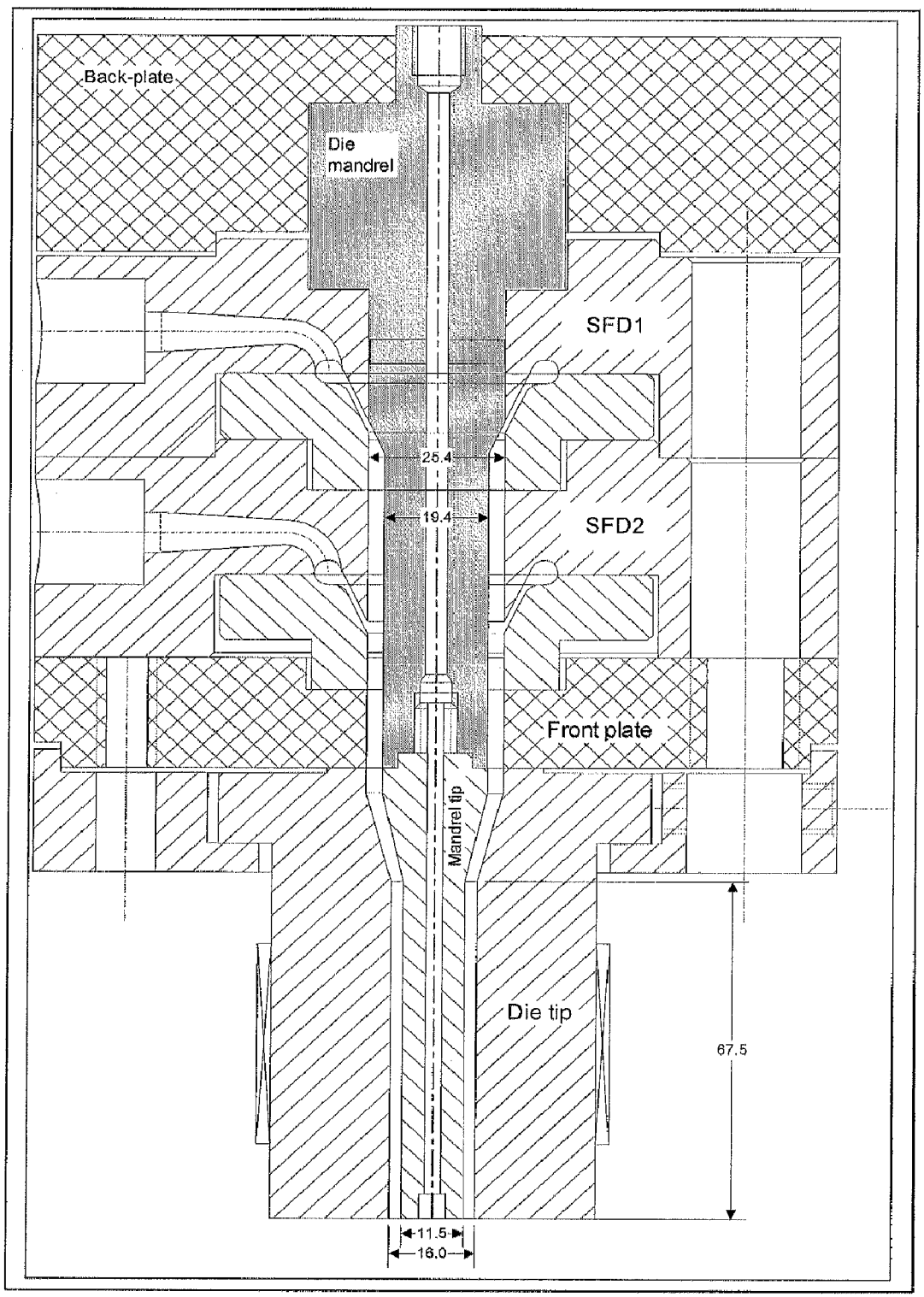

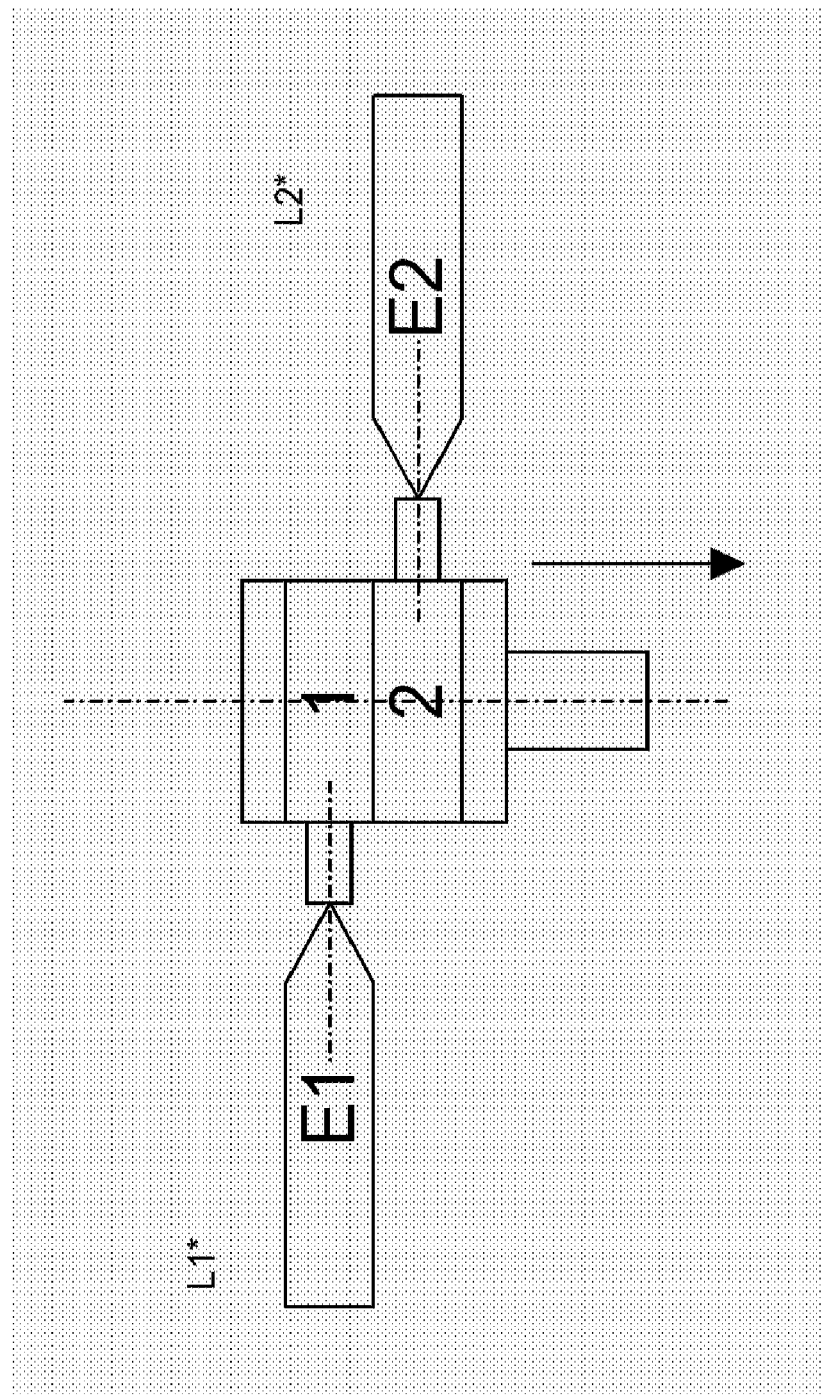
Figure 2. Co-Extrusion Device Setup

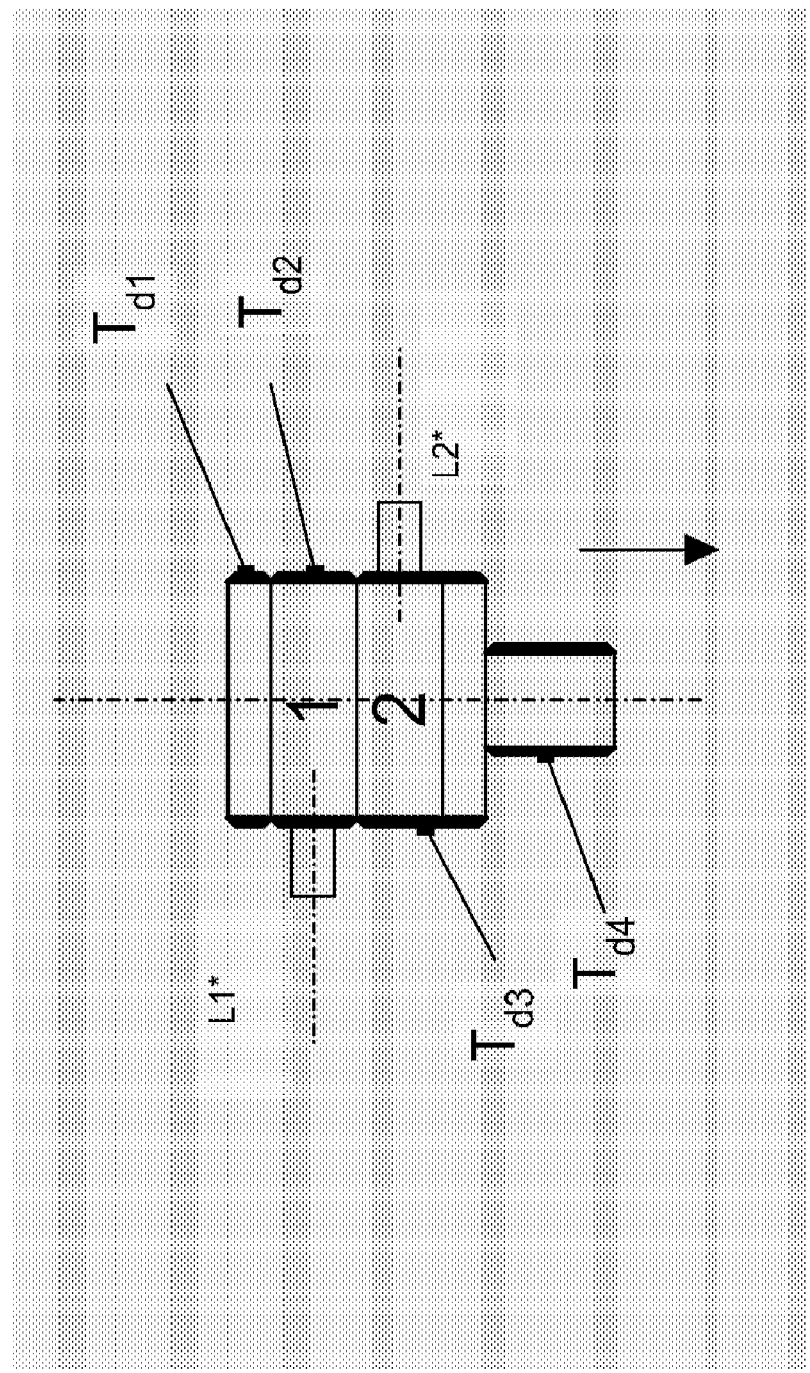
Figure 3. Die Temperature Zones

MULTILAYER POLYMER STRUCTURE

The present application is a national stage application under 35 U.S.C. §371 of International Application No. PCT/EP2007/053634, filed Apr. 13, 2007, which claims the benefit of U.S. provisional application No. 60/792,631, filed Apr. 18, 2006, the whole content of each application being herein incorporated by reference for all purposes.

The present invention is directed to an improved multilayer polymer structure, to a process for the manufacture of said polymer structure, to a shaped article comprising said polymer structure and to a process for the manufacture of said shaped article.

Polyolefins like ethylene based polymers are relatively cheap thermoplastic materials, showing good mechanical properties, dimensional stability and processability. Nevertheless such materials are characterized by poor barrier properties towards different types of chemical compounds (e.g. hydrocarbons, fuels, gases like oxygen, vapors like water vapor). That makes them unsuitable for certain applications like, for instance, fuel tanks, automotive fuel lines, food packaging, clean air ducts, etc.

Prior art solutions which aim at limiting, at least to some extent, this problem consist in very complex five or six layer constructions which incorporate a barrier layer of poly(ethylene-vinyl alcohol) or aliphatic polyamide within a multilayer polyolefin (e.g. polyethylene) based structure.

However, for certain demanding applications, there is still a need for new multilayer polyolefin based structures having improved performance level as compared to the above mentioned prior art structures. Notably, there is a need for improved multilayer polyolefin based structures having still better barrier behavior, higher dimensional stability, lower delaminating tendency, higher mechanical strength, higher chemical stability and improved constancy of overall performance on aging. Furthermore, it would be highly desirable that such improved multilayer polyolefin based structures be more cost effective than prior art structures.

As a matter of fact, five or six layer co-extrusion or co-blow molding processes required to get the above mentioned prior art multilayer polyolefin based structures can be fairly capital intensive. In addition, five or six layer co-extrusion or co-blow molding processes that use poly(ethylene-vinyl alcohol) as a barrier layer are suspect to extensive purge and clean out procedures due to the degradation of such polymer over time. This results in additional higher cost. Similar processes with aliphatic polyamide are relatively more stable but the final five or six layer structure is generally inadequate for highly demanding barrier applications.

It would also be desirable that above mentioned improved multilayer polyolefin based structures be obtainable by processes more attractive than prior art manufacturing processes comprising coating, extrusion coating and/or adhesive lamination. In particular, such processes should be more suited than prior art processes, notably for the manufacture of multilayered shaped articles as complex and/or diversified as multilayered film in flat form and/or in tubing form (e.g. automotive fuel lines or hoses, vapor lines, heat exchanger tubings), and multilayered hollow-bodies, especially those having very complex cross-sectional configuration like fuel tanks.

While it is true that some prior art multilayer polyolefin based structures have already been manufactured by co-extrusion, the viability of such process in the case of new multilayer structures comprising polymers different from those already used in the art is highly unpredictable.

This is due to the fact that, generally speaking, the success of any co-extrusion process depends not only on the design of the die and the way how the individually extruded melts are brought together, but also on the choice of the polymers forming the various layers of the multilayer structure.

In addition, inadequate co-extrusion parameters and/or inadequate selection of the polymer layers resulted in various problems, including for instance delamination due to weak inter-layer adhesion, partial degradation of the polyolefin layer especially at high temperature, low dimensional stability of the multilayer structure at the output of the die due to the insufficient melt strength of the polyolefin especially at high temperature, unacceptable surface quality, unstable and/or poorly reproducible operating conditions.

The present invention aims at meeting most of, if not all, the above described needs and overcoming most of, if not all, the above described problems.

DESCRIPTION OF THE DRAWINGS

FIG. 1. Modular co-Extrusion Cylindrical Die
FIG. 2. Co-Extrusion Device Setup
FIG. 3. Die Temperature Zones

DESCRIPTION OF THE INVENTION

The present invention is directed to a multilayer structure comprising at least one couple (L1-L2) of adjacent layers (L1) and (L2), wherein:
  layer (L1) comprises at least one polymer composition (C1) comprising: (i) at least one semi-aromatic polyamide, and (ii) at least one impact modifier (I1);
  layer (L2) comprises at least one polymer composition (C2) comprising: (i) at least one un-functionalized polyolefin (PO2); and (ii) at least one functionalized polyolefin (FPO2), said functionalized polyolefin comprising functional groups chosen from carboxylic groups, their esters, their anhydrides and their salts.

The Multilayer Structure

The invented multilayer structure comprises at least one couple (L1-L2) of adjacent layers (L1) and (L2). In certain of its embodiments, the multilayer structure comprises more than two layers. Examples of multilayer structures comprising more than two layers include multilayer structures comprising no more than one couple (L1-L2) and at least one additional layer, in particular trilayer and tetralayer structures in which the additional layer(s) can be the innermost layer and/or the outermost layer.

The invented multilayer structure is advantageously a hollow body or a part thereof. When the multilayer structure is a hollow body or a part thereof, layer (L1) can be either more inner or more outer than layer (L2). Preferably, layer (L1) is more inner than layer (L2).

The expressions "more inner" and "more outer" refer to the relative position of a layer respect to another within the multilayer structure when said multilayer structure is a hollow body or a part thereof. A layer comprised in the multilayer structure is "more inner" than another when the first one is on the or closer to the inside of the multilayer structure, the inside of the multilayer structure being defined, for the purpose of the present invention, as the side directly facing the region of space which is partially or completely enclosed by the hollow body; a layer comprised in the multilayer structure of the hollow body is "more outer" than another, when the first one is on the or closer to the outside of the multilayer structure, the outside of the multilayer structure being defined as the side facing away from the inside of the multilayer structure.

Usually, the multilayer structure comprises at most 4 layers. Preferably, the multilayer structure is a bilayer structure. This means that layers (L1) and (L2) are the sole layers. When the multilayer structure is a bilayer structure and it is a hollow body or a part thereof, layer (L1) can be either the inner or the outer layer; preferably, layer (L1) is the inner layer.

In the invented multilayer structure, layer (L1) provides advantageously the multilayer structure, notably, with excellent chemical resistance and impermeability to fluid such as hydrocarbon fuels and alcohols, and in certain embodiments of the present invention, layer (L1), if needed, also imparts the ability to dissipate static electrical charge. Layer (L2) provides advantageously the invented multilayer structure, notably, with dimensional stability, strength and cost effectiveness.

Additional layers, if present, may be used to further improve the overall performance level of the multilayer structure, in particular its mechanical strength, impermeability and its dimensional stability in order to meet the requirements of certain specific applications.

Layer (L1)

The physical dimensions of layer (L1) are not particularly limited.

In certain preferred embodiments of the present invention, the thickness of layer (L1) is of at least 0.002 mm, more preferably of at least 0.02 mm, still more preferably of at least 0.1 mm. In addition, in said embodiments, the thickness of layer (L1) is smaller than 2 mm.

The weight percent of polymer composition (C1) to the total weight of layer (L1), is advantageously of at least 10 wt. %, preferably of at least 40 wt. %, more preferably of at least 60 wt. %, still more preferably of at least 80 wt. %. Most preferably, layer (L1) consists essentially of polymer composition (C1).

The semi-aromatic polyamide is a polymer of which more than 15 mole % of the recurring units comprise at least one amide group (—CONH—), at least one arylene group, such as phenylene, naphthalene, p-biphenylene and metaxylylene, and at least one non aromatic group, such as an alkylene group.

Said recurring units can be obtained notably by (i) condensation reaction of an aromatic dicarboxylic acid monomer with an aliphatic diamine monomer, (ii) condensation reaction of an aliphatic dicarboxylic acid monomer with an aromatic diamine monomer, (iii) condensation reaction of an aromatic dicarboxylic acid monomer with an aromatic diamine monomer, (iv) auto-condensation of an aromatic amino-acid, and combinations thereof.

Ortho-phthalic acid, isophthalic acid, terephthalic acid and 2,6-naphthalene dicarboxylic acid are examples of aromatic dicarboxylic acid monomers, while meta-phenylene diamine, meta-xylylene diamine and para-xylylene diamine are examples of aromatic diamine monomers.

Adipic acid and sebacic acid are examples of suitable aliphatic dicarboxylic acid monomers, while hexamethylene diamine, methylpentamethylene diamine and nonanediamine are examples of suitable aliphatic diamine monomers.

The semi-aromatic polyamide may further comprise recurring units consisting of at least one amide group and at least one alkylene group. Said recurring units can be obtained notably by condensation reaction of an aliphatic dicarboxy acid monomer with an aliphatic diamine monomer, or by auto-condensation of an aliphatic amino-acid.

The semi-aromatic polyamide comprises preferably more than 15 mole %, based on the total number of moles of recurring units, of recurring units obtained by (i) condensation reaction of an aliphatic dicarboxylic acid monomer with an aromatic diamine monomer and/or (ii) condensation reaction of an aromatic dicarboxylic acid monomer with an aliphatic diamine monomer.

Besides, the semi-aromatic polyamide comprises preferably less than 15 mole %, based on the total number of moles of recurring units, of recurring units obtained by (iii) condensation reaction of an aromatic dicarboxylic acid monomer with an aromatic diamine monomer, and (iv) auto-condensation of an aromatic amino-acid.

More preferably, the semi-aromatic polyamide is a PMXDA, a polyphthalamide, or a mixture of a PMXDA and a polyphthalamide. Still more preferably the semi-aromatic polyamide is a PMXDA.

"PMXDA" is herein intended to denote a semi-aromatic polyamide of which more than 50 mole % of the recurring units, based on the total number of moles of recurring units, are obtained by condensation reaction of an aliphatic dicarboxylic acid monomer, preferably adipic acid, with an aromatic diamine monomer, preferably meta-xylylene diamine.

PMXDA useful for the present invention comprises preferably at least 70 mole %, more preferably at least 80 mole %, still more preferably at least 90 mole % and the most preferably at least 95 mole % of recurring units obtained by condensation reaction of adipic acid and meta-xylylene diamine.

PMXDA as complying with these features are notably commercially available as IXEF® polyamides from Solvay Advanced Polymers, L.L.C.

The molecular weight of the PMXDA is not particularly limited. In certain preferred embodiments of the present invention the PMXDA has number average molecular weight ($M_n$) of at least 3,000, more preferably of at least 7,000, still more preferably of at least 22,000. In addition, in said embodiments, the PMXDA has number average molecular weight ($M_n$) of at most 60,000, more preferably of at most 50,000 and still more preferably of at most 30,000.

$M_n$ is calculated according to the following formula $$M_n = 2 \times 10^6 / \Sigma(\text{—COOH end groups}) + (\text{—NH2 end groups})$$

(—COOH end groups)=number of acid end groups in µequivalents/gram of product resin (titrated with a base)

(—NH2 end groups)=number of basic end groups in µequivalents/gram of product resin (titrated with an acid)

Polyphthalamide herein is intended to denote any semi-aromatic polyamide of which at least 35 mole % of the recurring units, based on the total number of moles of recurring units, are formed by copolymerizing at least one phthalic acid monomer with at least one aliphatic diamine monomer.

Phthalic acid monomer herein is intended to denote anyone of ortho-phthalic acid, isophthalic acid, terephthalic acid or mixtures thereof.

The aliphatic diamine monomer is advantageously a $C_3$-$C_{12}$ aliphatic diamine, preferably a $C_6$-$C_9$ aliphatic diamine, and more preferably, is hexamethylene-diamine.

Polyphthalamides are commercially available as AMODEL® polyamides from Solvay Advanced Polymers, L.L.C.

According to the present invention, the polyphthalamide is preferably a polyterephthalamide.

Polyterephthalamide herein is intended to denote a polyphthalamide of which at least 35 mole % of the recurring units, based on the total number of moles of recurring units, are formed by copolymerizing terephthalic acid with at least one aliphatic diamine.

The polyphthalamide is more preferably a polyterephthalamide formed by copolymerizing terephthalic acid monomer, optionally isophthalic acid monomer, and at least one aliphatic dicarboxylic acid monomer, preferably adipic acid, with at least one aliphatic diamine monomer, preferably hexamethylene-diamine.

The weight percent of the semi-aromatic polyamide to the total weight of the polymer composition (C1) is advantageously of at least 50 wt. %, preferably of at least 60 wt. %, and more preferably of at least 70 wt. %. Besides, the weight percent of the semi-aromatic polyamide to the total weight of the polymer composition (C1) is advantageously of at most 95 wt. %, and preferably of at most 90 wt. %.

Impact modifiers suitable for the present invention are not particularly limited insofar as they impart useful mechanical properties to polymer composition (C1), such as sufficient tensile elongation at yield and break. Advantageously, impact modifier (I1) further improves the processability of composition (C1), notably its aptitude to be co-extruded and/or co-blow molded.

Impact modifier (I1) is advantageously chosen from: (i) functionalized elastomeric and un-functionalized elastomeric polymers other than polyolefins; (ii) un-functionalized polyolefins (PO1); (iii) functionalized polyolefins (FPO1); (iv) mixtures thereof.

The term "polyolefin" is herein intended to denote a polymer the recurring units of which are obtained by polymerization of unsaturated aliphatic hydrocarbons.

Functionalized elastomeric and un-functionalized elastomeric polymers other than polyolefins useful for the present invention are for example: ethylene (defined hereinafter shortly as "Ee")/1-octene (defined hereinafter shortly as "1Oe")/styrene terpolymers, Ee/1Oe/acrylonitrile terpolymers, Ee/1Oe/methylacrylate terpolymers, Ee/1Oe/vinyl acetate terpolymers, Ee/1Oe/methyl methacrylate terpolymers, propylene (defined hereinafter shortly as "Pe")/1Oe/styrene terpolymers, Pe/1Oe/acrylonitrile terpolymers, Pe/1Oe/methylacrylate terpolymers, Pe/1Oe/vinyl acetate terpolymers, Pe/1Oe/methyl methacrylate terpolymers, nitrile butadiene rubbers, styrene/butadiene rubbers, styrene/Ee/butadiene/styrene rubbers where butadiene may be hydrogenated or not, Ee/acrylic cross-linked rubbers (copolymers of ethylene with methyl methacrylate), trans-1,4-polychloroprene (chloroprene rubbers or neoprene), polyethers like epichlorohydrin elastomers and propylene oxide elastomers, polypentenamers such as polycyclopentene, thermoplastic urethane elastomers, and mixtures thereof.

Un-functionalized polyolefins (PO1) useful for the present invention are for example: Ee homopolymers; copolymers and terpolymers of Ee with α-olefins like for instance: Ee/1-butene (1Be) copolymers, Ee/1-hexene (1H) copolymers, Ee/1Oe copolymers, Ee/1Be/1H terpolymers, Ee/Pe/1Oe terpolymers, Ee/1Be/1Oe terpolymers, Ee/1Oe/1-pentene terpolymers; Pe/1Oe copolymers; Pe/1Be/1Oe terpolymers; Ee/1Oe/1,4-hexadiene terpolymers; Pe/1Oe/1,4-hexadiene terpolymers; Ee/1Oe/ethylidenenorbornene terpolymers; Pe/1Oe/ethylidenenorbornene terpolymers; Ee/Pe copolymers (commonly known as "EPR rubbers"); Ee/Pe/diene terpolymers like for example Ee/Pe/1,4-hexadiene terpolymers and Ee/Pe/ethylidene norbornene terpolymers (commonly known as "EPDM rubbers"); cis-1,4-poly-butadiene (commonly known as "butadiene rubbers"); cis-1,4-polyisoprene (commonly known as "natural rubber").

The un-functionalized polyolefin (PO1) is advantageously chosen from the homopolymers of ethylene, the copolymers of ethylene with at least one α-olefin and the copolymers of ethylene with at least one α-olefin and at least one diene.

The un-functionalized polyolefin (PO1) is preferably a copolymer of ethylene with at least one α-olefin.

The functionalized polyolefin (FPO1) advantageously comprises functional groups chosen from carboxylic groups, their esters, their anhydrides and their salts.

Impact modifier (I1) is preferably chosen from: (i) un-functionalized polyolefins (PO1); (ii) functionalized polyolefins (FPO1) comprising functional groups chosen from carboxylic groups, their esters, their anhydrides and their salts; (iii) mixtures thereof.

Impact modifier (I1) is more preferably a functionalized polyolefin (FPO1) comprising functional groups chosen from carboxylic groups, their esters, their anhydrides and their salts.

The functionalized polyolefin (FPO1) can be obtained by any technique known in the art, for example by copolymerizing at least one olefin with at least one ethylenically unsaturated monomer bearing at least one suitable functional group. Preferably, the functionalized polyolefin (FPO1) is obtained by grafting at least one grafting agent (G1) onto at least one un-functionalized polyolefin (PO1').

The grafting agent (G1) is advantageously chosen from ethylenically unsaturated carboxylic acids, their esters, their anhydrides and their salts.

The grafting agent (G1) is preferably chosen from ethylenically unsaturated compounds comprising at most two carboxylic groups. More preferably, the grafting agent (G1) further comprises from 3 to 20 carbon atoms, like acrylic acid, methacrylic acid, maleic acid, fumaric acid, itaconic acid, crotonic acid, citraconic acid, maleic anhydride (MAH), succinic anhydride, itaconic anhydride, crotonic anhydride, citraconic anhydride and mixtures thereof. Still more preferably, the grafting agent (G1) is chosen from maleic anhydride (MAH), succinic anhydride, acrylic acid, methacrylic acid, maleic acid, succinic acid and mixtures thereof. The most preferably, the grafting agent (G1) is maleic anhydride (MAH).

The weight percent of grafting agent (G1) to the total weight of the functionalized polyolefin (FPO 1), is advantageously of at least 0.01 wt. %, preferably of at least 0.1 wt. %, more preferably of at least 0.2 wt. %, and still more preferably of at least 0.4 wt. %. In addition, it is advantageously of at most 5.0 wt. %, preferably of at most 3.0 wt. %, more preferably of at most 2 wt. % and still more preferably of at most 1.5 wt. %

The un-functionalized polyolefins (PO1') is advantageously chosen from the homopolymers of ethylene, the copolymers of ethylene with at least one α-olefin and the copolymers of ethylene with at least one α-olefin and at least one diene.

The un-functionalized polyolefin (PO1') is preferably a copolymer of ethylene with at least one α-olefin.

The above mentioned α-olefin is advantageously chosen from the α-olefins comprising from 3 to 8 carbon atoms (e.g. propylene, 1-butene, 1-pentene, 1-hexene, 1-octene, and isomers thereof), and preferably from those comprising from 4 to 6 carbon atoms (e.g. 1-butene, 1-pentene, 1-hexene, and isomers thereof).

The above mentioned copolymers of ethylene with at least one α-olefin advantageously comprise at least 50 mole % of ethylene recurring units based on the total number of moles of recurring units. Preferably, these copolymers comprise at least 60 mole % of ethylene recurring units based on the total number of moles of recurring units. In addition, these copolymers advantageously comprise at most 95 mole % and preferably at most 90 mole % of ethylene recurring units based on the total number of moles of recurring units.

The functionalized polyolefin (FPO1) has a crystalline melting point advantageously of at least 100° C., preferably of at least 110° C. and more preferably of at least 115° C. In addition, the crystalline melting point is advantageously of at most 130° C., and preferably of at most 125° C. Crystalline melting point was measured according to ISO standard 11357.

The melt flow index of the functionalized polyolefin (FPO1) is conventionally measured, according to ASTM 1238 or ISO standard 1133, at 190 or 230° C., and under a load of 2.16, 5 or 10 kg, (MI2, MI5 or MI10), depending from its melt viscosity, as is well known in this art, Taking these provisions into account, the MI of FPO1 is generally of at least 0.1 g/10 min, preferably of at least 0.5 g/10 min, more preferably of at least 2.0 g/10 min, and most preferably of at least 5.0 g/10 min. In addition, MI is generally of at most 35 g/10 min, preferably of at most 25 g/10 min and, more preferably of at most 20 g/10 min.

In certain embodiments of the present invention, the functionalized polyolefin (FPO1) is a maleated linear low density polyethylene (LLDPE) wherein the weight percent of the grafted maleic anhydride units to the total weight of the maleated linear low density polyethylene is of at least 0.3 wt. %. The expression "linear low density polyethylene (LLDPE)" is herein intended to denote copolymers of ethylene with α-olefins, wherein the ethylene recurring units are at least 50 mole % of the total number of recurring units and at most 90 mole %.

Commercially available compositions comprising functionalized polyolefins useful for the purpose of the present invention are, for example; EXXELOR® VA 1801 maleated Ee/Pe copolymers, available from the Exxon Mobil Chemical Company; EXXELOR® VA 1850, available from the Exxon Mobil Chemical Company; EXXELOR® VA 1201 maleated Ee medium viscosity copolymers, available from the Exxon Mobil Chemical Company, ROYALTUF® 498 maleated Ee/Pe/diene terpolymers, available from the Crompton Corporation; FUSABOND® 493D maleated Ee/1-Oe copolymers and FUSABOND® E MB226 DE maleated-LLDPE, available from the DuPont Company. Other commercially available compositions comprising functionalized polymers other than polyolefins useful for the purpose of the present invention are, for example: SURLYN® 9920 acrylic or acrylate-modified polyethylene rubbers, available from the DuPont Company; KRATON® FG190X maleic anhydride-modified styrene-Ee-butylene-styrene block copolymers, available from Kraton Polymers.

Impact modifiers particularly suitable for the purpose of the present invention are selected among the maleated Ee copolymers.

The amount of impact modifier (I1) is advantageously sufficient to impart notably desirable mechanical characteristics (e.g. tensile elongation at yield and break) and processability to polymer composition (C1).

The weight percent of impact modifier (I1) to the total weight of polymer composition (C1), is preferably of at least 5 wt. %, more preferably of at least 10 wt. %, still more preferably of at least 15 and the most preferably of at least 20 wt. %. Besides, the weight percent of impact modifier (I1) to the total weight of polymer composition (C1), is preferably less than 50 wt. %, more preferably less than 40 wt. %, and still more preferably less than 30 wt. %.

In certain preferred embodiments of the present invention, polymer composition (C1) further comprises an electrically conductive filler.

Advantageously, the electrically conductive filler is chosen from carbon powder, carbon black, carbon nano-tubes and mixtures thereof. Carbon nano-tubes useful for the present invention are either multi-wall or single-wall nano-tubes. Preferably, the electrically conductive filler is carbon black. Commercially available carbon blacks suitable for the purpose of the present invention are for instance electroconductive carbon blacks, available in the form of pellets from AKZO NOBEL under the trade names Ketjenblack EC-600JD and Ketjenblack EC-300J. Advantageously, the electrically conductive filler has surface area of at least 500 m$^2$/g, preferably of at least 800 m$^2$/g, more preferably of at least 1000 m$^2$/g, and still more preferably of at least 1300 m$^2$/g. The surface area was measured according to the BET method.

In these embodiments, the weight percent of the electrically conductive filler to the total weight of polymer composition (C1) is advantageously of at least 1 wt. %, preferably of at least 2 wt. % and more preferably of at least 3 wt. %. Besides the weight percent of the electrically conductive filler to the total weight of polymer composition (C1) is advantageously of at most 25 wt. %, preferably of at most 20 wt. %, more preferably of at most 15 wt. %, still more preferably of at most 10 wt. % and the most preferably of at most 5 wt. %.

In these embodiments, the weight percent of the semi-aromatic polyamide to the total weight of polymer composition (C1) is advantageously of at least 60 wt. %, and preferably of at least 65 wt. %. In addition, it is advantageously of at most 85 wt. %, preferably of at most 80 wt. % and more preferably of at most 75 wt. %.

Besides, in these embodiments the weight percent of the impact modifier (I1) to the total weight of the polymer composition (C1) is advantageously of at least 15 wt. %, preferably of at least 20 w. %. In addition, it is advantageously of at most 45 wt. %, preferably of at most 35 wt. % and more preferably of at most 30 wt. % In certain other embodiments of the present invention, polymer composition (C1) is free from an electrically conductive filler.

In these other embodiments, the weight percent of the impact modifier (I1) to the total weight of the polymer composition (C1) is advantageously of at least 10 wt. %. Besides, it is advantageously of at most 25 wt. % and preferably of at most 20 wt. %.

In these other embodiments, the weight percent of the semi-aromatic polyamide to the total weight of the polymer composition (C1) is advantageously of at least 75 wt. %. Besides, it is advantageously of at most 90 wt. % and preferably of at most 85 wt. %.

Optionally, polymer composition (C1) further comprises one or more additives like lubricants, pigments, antioxidants and process-stabilizing agents, heat stabilizers, dyes, flame retardants, plasticizers, mold release agents, light stabilizers, fillers other than the electrically conductive filler and polyamides other than the semi-aromatic polyamide. Said additives may be employed alone or in any combination. The levels of such additives can be determined for the particular use envisioned by one of ordinary skill in the art in view of this disclosure; very often, it does not exceed 10 wt. %; often, it is below 5 wt. %.

Examples of preferred lubricants useful for polymer composition (C1) are metallic stearates, polytetrafluoroethylene (PTFE), low density polyethylene (LDPE), metal sulfides such as MoS$_2$, graphite, boron nitride and mixtures thereof. More preferably, the lubricant comprises a PTFE and still more preferably, it comprises a non fibrillating PTFE, such as POLYMIST® F5A available from Solvay Solexis SpA. The weight amount of lubricant, based on the total weight of polymer composition (C1) ranges preferably from 0.10 wt. % to 1.0 wt. %.

Antioxidants and process-stabilizing agents possibly useful as ingredients of polymer composition (C1) are notably sterically hindered amines, sterically hindered phenols (e.g. pentaerythritol tetrakis(3,5-di-tert-butyl-4-hydroxyhydrocinnamate; N,N'-hexamethylene bis(3,5-di-t-butyl-4-hydroxyhydrocinnamamide), phosphites [e.g. tris(2,4-di-tert-butylphenyl)phosphite], phosphonites, thiosynergists, and mixtures thereof. Antioxidants are often used in a weight amount ranging from 0.10 wt. % to 1.0 wt. %, based on the total weight of polymer composition (C1). Antioxidants and process-stabilizing agents useful for the present invention are, for instance, IRGANOX® 1010, IRGANOX® 1098, and IRGANOX® MD1024 available from Ciba, phenolic based antioxidants; IRGAFOS® 168 available from Ciba, process-stabilizing agent.

In certain embodiments of the present invention polymer composition (C1) further comprises at least one lubricant, at least one antioxidant and at least one process-stabilizing agent.

Heat stabilizers possibly useful as ingredients of polymer composition (C1) are notably copper-based stabilizers comprising a copper compound soluble in the polyamide and an alkali metal halide. Examples thereof are mixtures of copper iodide and/or copper bromide with an alkali bromide and/or iodide.

Fillers other than electrically conductive filler possibly useful as ingredients of polymer composition (C1) are notably glass fibers, carbon fibers, graphite fibers, silicon carbide fibers, aramide fibers, wollastonite, talc, mica, titanium dioxide, potassium titanate, silica, kaolin, chalk, alumina, boron nitride, aluminum oxide. Such fillers improve possibly notably mechanical strength (e.g. flexural modulus) and/or dimensional stability and/or friction and wear resistance.

Semi-aromatic polyamide, impact modifier (I1), optionally electrically conductive filler as well as the other additives previously mentioned may be mixed together in any manner known in the art. Mixing may be done preliminary to co-extrusion in a separate extruder or it may be done immediately before co-extrusion in the same extruder used to feed the co-extrusion die.

Layer (L2)

The physical dimensions of layer (L2) are not particularly limited.

In certain preferred embodiments of the present invention, the thickness of layer (L2) is of at least 0.001 mm, more preferably of at least 0.002. In addition, in said preferred embodiments, the thickness of layer (L2) is smaller than 1 mm.

In certain other preferred embodiments of the present invention, the thickness of layer (L2) is of at least 1 mm. In addition, in said other preferred embodiments, the thickness of layer (L2) is of at most 8 mm, more preferably of at most 6 mm, and still more preferably of at most 4 mm.

In certain still other preferred embodiments of the present invention, the thickness of layer (L2) is larger than 4 mm. In addition, in said still other preferred embodiments, the thickness of layer (L2) is of at most 15 mm, more preferably of at most 10 mm, still more preferably, of at most 8 mm.

The weight percent of polymer composition (C2) to the total weight of layer (L2), is advantageously of at least 10 wt. %, preferably of at least 40 wt. %, more preferably of at least 60 wt. %, still more preferably of at least 80 wt. %. Most preferably, layer (L2) consists essentially of polymer composition (C2).

The un-functionalized polyolefin (PO2), advantageously, comprises at least 70 mole % of ethylene recurring units based on the total number of moles of recurring units, and preferably at least 80 mole %.

In certain embodiments of the present invention, the un-functionalized polyolefin (PO2) is an ethylene homopolymer.

In certain other embodiments of the present invention, the un-functionalized polyolefin (PO2) is a copolymer of ethylene with at least one α-olefin. Said α-olefin complies with all of the characteristics of the α-olefin previously described in the case of the un-functionalized polyolefin (PO1'), at any level of preference.

In the above mentioned copolymers, the weight percent of the recurring units derived from the copolymerized α-olefin(s) to the total weight of the un-functionalized polyolefin (PO2) is advantageously of at least 0.1 wt. %, preferably of at least 0.5 wt. % and more preferably of at least 1.0 wt. %. In addition, it is advantageously of at most 10 wt. % and preferably of at most 5 wt. %.

The un-functionalized polyolefin (PO2) has standard density advantageously of at least 930 kg/m$^3$, preferably of at least 935 kg/m$^3$, more preferably of at least 938 kg/m$^3$ and still more preferably of at least 940 kg/m$^3$. In addition, standard density is advantageously of at most 960 kg/m$^3$, preferably of at most 955 kg/m$^3$ and more preferably of at most 948 kg/m$^3$ Standard density was measured according to ISO standard 1183.

The un-functionalized polyolefin (PO2) has a melting point advantageously of at least 110° C., preferably of at least 120° C. and more preferably of at least 130° C. In addition, melting point is advantageously of at most 140° C. and preferably of at most 138° C. Melting point was measured according to ISO standard 11357.

The un-functionalized polyolefin (PO2) has melt flow index, MI5, advantageously of at least 0.1 g/10 min, preferably of at least 0.2 g/10 min and more preferably of at least 0.3 g/10 min. In addition, melt flow index, MI5, is advantageously of at most 5 g/10 min, preferably of at most 3 g/10 min, more preferably of at most 1 g/10 min and still more preferably of at most 0.6 g/10 min. MI5 was measured at 190° C. under a load of 5 kg, according to ISO standard 1133.

The un-functionalized polyolefin (PO2) has melt viscosity, advantageously of at least 1000 Pa·s, preferably of at least 1500 Pa·s, and more preferably of at least 2000 Pa·s (at share rate of 100 s$^{-1}$ and temperature of 190° C.). Besides, melt viscosity is advantageously of at most 2800 Pa·s and preferably of at most 2500 Pa·s.

In certain embodiments of the present invention, the un-functionalized polyolefin (PO2) has melt flow index MI5 of at most 1 dg/min and melt viscosity of at least 2000 Pa·s (at share rate of 100 s$^{-1}$ and temperature of 190° C.).

The un-functionalized polyolefin (PO2) has advantageously narrow or broad molecular weight distribution. Preferably, it has broad molecular weight distribution.

Polyolefins useful as un-functionalized polyolefins (PO2) are notably commercially available under the trade name PE ELTEX® grades from Ineos.

The functionalized polyolefin (FPO2), likewise functionalized polyolefin (FPO1), advantageously comprises functional groups chosen from carboxylic groups, their esters, their anhydrides and their salts.

The functionalized polyolefin (FPO2) can be obtained by any technique known in the art. For example, by copolymerizing at least one olefin with at least one ethylenically unsaturated monomer bearing at least one suitable functional group. Preferably it is obtained by grafting at least one suitable grafting agent (G2) onto at least one un-functionalized polyolefin (PO2').

Grafting agent (G2) is advantageously chosen from the same group of compounds as those previously described in the case of (G1), at any level of preference.

In certain embodiments, the un-functionalized polyolefin (PO2') complies with all of the structural features of the un-functionalized polyolefin (PO1') and the functionalized polyolefin (FPO2) complies with all of the features of the functionalized polyolefin (FPO1), at any level of preference.

In certain preferred embodiments, the un-functionalized polyolefin (PO2') complies with all of the structural features of the un-functionalized polyolefin (PO2), at any level of preference.

In these preferred embodiments, the weight percent of grafting agent (G2) to the total weight of (FPO2) is advantageously of at least 0.1 wt. %, and preferably of at least 0.2 wt. %. In addition, the weight percent is advantageously of at most 2.0 wt. %, preferably of at most 1.0 wt. % and more preferably of at most 0.6 wt. %.

In these preferred embodiments, the melting temperature of the functionalized polyolefin (FPO2) is advantageously of at least 120° C. and preferably of at least 125° C. In addition, melting temperature is advantageously of at most 140° C., and preferably of at most 135° C. Melting temperature was measured according to ISO 11357.

In certain of these preferred embodiments, the standard density of the functionalized polyolefin (FPO2) is advantageously of at least 930 kg/m$^3$ and preferably of at least 935 kg/m$^3$. In addition, standard density is advantageously of at most 950 kg/m$^3$ and preferably of at most 945 kg/m$^3$.

In certain other of these preferred embodiments, the standard density of the functionalized polyolefin (FPO2) is advantageously of at least 940 kg/m$^3$ and preferably of at least 945 kg/m$^3$. In addition, standard density is advantageously of at most 960 kg/m$^3$ and preferably of at most 955 kg/m$^3$. Standard density was measured according to ISO standard 1183.

In certain of these preferred embodiments, melt flow index, MI5, of the functionalized polyolefin (FPO2) is of at least 0.5 g/10 min, more preferably of at least 1.0 g/10 min and still more preferably of at least 1.5 g/10 min. In addition, MI5 is of at most 10 g/10 min, more preferably of at most 5 g/10 min, and still more preferably of at most 2.5 g/10 min.

In certain other of these preferred embodiments, melt flow index MI5 of functionalized polyolefin (FPO2) is more than 10 g/10 min, more preferably of at least 20 g/10 min and still more preferably of at least 25 g/10 min. In addition, MI5 is of at most 50 g/10 min, more preferably of at most 40 g/10 min, and still more preferably of at most 30 g/10 min. MI5 was measured at 190° C. under a load of 5 kg, according to ISO standard 1133.

Polymer composition (C2), likewise (C1), optionally further comprises one or more additives like those previously described for (C1). Preferably, polymer composition (C2) further comprises at least one antioxidant. Addition of at least one antioxidant may be useful to improve thermal and chemical stability of polymer composition (C2) as well as long-term adhesion behavior of layer (L2).

Other antioxidants which may be added to polymer composition (C2), besides those previously mentioned for (C1), are for example phenolic antioxidants comprising one or more sterically hindered phenol groups and free from an ester group, or mixtures thereof.

Among these antioxidants mention may be made of: 1,1,3-tris(2-methyl-4-hydroxy-5-t-butylphenyl) butane; 2,2'-isobutylidenebis(4,6-dimethylphenol); 2,2'-methylenebis(6-t-butyl-4-methylphenol); 2,6-bis(α-methylbenzyl)-4-methylphenol; 4,4'-thiobis-(6-t-butyl-m-cresol); 2,2'-methylenebis(4-methyl-6-nonylphenol); 1,3,5-trimethyl-2,4,6-tris(3,5-di-t-butyl-4-hydroxybenzyl)benzene.

More preferably, polymer composition (C2) further comprises 1,3,5-trimethyl-2,4,6-tris(3,5-di-t-butyl-4-hydroxybenzyl)benzene as sole antioxidant. 1,3,5-Trimethyl-2,4,6-tris(3,5-di-t-butyl-4-hydroxybenzyl)benzene is commercially available, as IRGANOX® 1330, from Ciba.

The weight percent of the un-functionalized polyolefin (PO2) to the total weight of polymer composition (C2) is advantageously of at least 70 wt. %. In addition, it is advantageously of at most 99 wt. %.

The weight percent of the functionalized polyolefin (FPO2) to the total weight of polymer composition (C2) is advantageously of at least 1 wt. %. In addition, it is advantageously of at most 30 wt. %.

In certain embodiments, characterized in that polymer composition (C1) comprises an electrically conductive filler, the weight percent of the un-functionalized polyolefin (PO2) to the total weight of polymer composition (C2) is of at least 85 wt. %, preferably of at least 90 wt. %.

Besides in these embodiments comprising an electrically conductive filler, the weight percent of the functionalized polyolefin (FPO2) to the total weight of polymer composition (C2) is of at least 5 wt. % and preferably of at least 10 wt. %.

In certain other embodiments, characterized in that polymer composition (C1) is free from a conductive filler, the weight percent of the un-functionalized polyolefin (PO2) to the total weight of polymer composition (C2) is more than 90 wt. % and preferably of at least 95 wt. %.

Besides in these embodiments free from an electrically conductive filler, the weight percent of the functionalized polyolefin (FPO2) to the total weight of polymer composition (C2) is of at least 2 wt. % and preferably of at least 5 wt. %.

If needed, polymer composition (C2) may also comprise a regrind of layer(s) (L1) and/or (L2). The term "regrind" is herein intended to denote a recycled material produced by regrinding thermoplastic scrap and waste generated during the manufacturing of the multilayer structure.

In these embodiments comprising a regrind, the weight percent of the regrind to the total weight of polymer composition (C2) is advantageously of at least 10 wt. %, preferably of at least 20 wt. %, more preferably of at least 30 wt. % and still more preferably of at least 40 wt. %. In addition, the weight percent of the regrind is advantageously of at most 60 wt. % and preferably of at most 50 wt. %.

The un-functionalized polyolefin (PO2), the functionalized polyolefin (FPO2) and other optional components including additive(s) and/or a regrind of layer(s) (L1) and/or (L2) may be mixed together in any manner known in the art. Mixing may be done preliminary to co-extrusion in a separate extruder or it may be done immediately before co-extrusion in the same extruder used to feed the co-extrusion die.

The multilayer polymer structures of the invention generally have high tensile properties, high impact and tear strength and, in their conductive versions, dissipate static electrical charge very efficiently. Furthermore these multilayer polymer structures have usually better barrier properties (in particular for fuel, water and gases) than prior art multilayer structures comprising polyolefin materials (e.g. PE, LDPE, HDPE) and/or aliphatic polyamide materials (e.g. PA 6 or PA 66) and have improved cost effectiveness. The invented multilayer structures may generally be employed for a variety of applications where prior art multilayer structures comprising aliphatic polyamide and/or polyolefins are usually employed but provide better performance.

For example, invented multilayer structures may be used for: hot water applications where low permeation and higher temperature is required, low cost vapor lines, heat exchanger tubing, high temperature fuel system applications, and particularly at higher temperatures than conventional polyamide applications, fuel tanks, insulating devices in electric motors and other electronic devices, in industrial transformers for insulators and compressor motor coil insulators, packaging, coating.

The multilayer structures according to the invention generally have excellent chemical resistance to a variety of compounds such as alcohols, esters, ketones, weak acids, aliphatic and aromatic hydrocarbons.

The present invention is also directed to a process for manufacturing the multilayer structure as above described, which comprises co-extruding or co-blow molding (j) the polymer composition (C1), (jj) the polymer composition (C2), so as to obtain couple (L1-L2) of adjacent layers (L1) and (L2).

The present invention is also directed to a shaped article comprising the invented multilayer structure as above described. The invented shaped article is advantageously a hollow body chosen from the group of pipes, hoses, tubes, containers, fuel tanks and bottles. In certain embodiments of the present invention the hollow body is a hose the inner part of which is contacted with fuel. The present invention is also directed to a process for manufacturing the shaped article as above described, said process comprising co-extruding or co-blow molding polymer compositions (C1) and (C2).

Provided below are examples of co-extrusion tests aimed at obtaining tubular bilayer structures composed of an inner polyamide based layer (filled (L1*) and unfilled (L1*)') and an outer polyethylene based layer (L2*).

These examples are illustrative of the present invention, but not limitative thereof.

Raw Materials Involved in the Fabrication of Illustrative Bilayer Structures (L1*-L2*)s (1) Semi-aromatic polyamide: IXEF® PMXD6 polyamide available from Solvay Advanced Polymers, L.L.C., comprising more than 95 mole % of recurring units obtained by condensation reaction of adipic acid and meta-xylylene diamine, having estimated average number molecular weight ($M_n$) of 15900-16260 [where $M_n = 2 \times 10^6/$(Sum of end-groups in micro equivalents per gram titrated by base and end-groups in micro equivalents per gram titrated with acid)]

(2.a) Impact modifier (I1.a*): FUSABOND® EMB226DE maleic anhydride grafted linear low density polyethylene (MAH-g-LLDPE), available from DuPont de Nemours, having melt flow index MI2 of 1.5 g/10 min (190° C./2.16 kg) and grafted MAH content of 0.75-1.0 wt. %.

(2.b) Impact modifier (I1.b*): EXXELOR® VA 1201 maleic anhydride grafted medium viscosity ethylene copolymer, available from Exxon Mobil Chemical, having melt flow index MI2 of 1.5 g/10 min (190° C./2.16 kg) and grafted MAH content of 0.75-1.0 wt. %.

(3) Electrically conductive filler: KETJENBLACK® EC600JD, available from Akzo Nobel, electrically conductive carbon black having high specific surface of 1400 m²/g (BET method).

(4) Un-functionalized polyolefin (PO2*): ELTEX® B6922 N1347, available from Ineos, high density polyethylene (HDPE) having a melt flow index MI5 of 0.4 g/10 min (190° C./5 kg), standard density of 944 kg/m³, crystalline melting point of 132° C.

(5) Functionalized polyolefin (FPO2*): PRIEX® 11002, available from SOLVAY SA, maleic anhydride grafted high density polyethylene (MAH-g-HDPE) having melt flow index MI5 of
2 g/10 min (190° C./5 kg), standard density of 940 kg/m³, crystalline melting point of 132° C., and grafted MAH content of 0.4 wt. %.

(6) Additives:
POLYMIST® F5A available from Solvay Solexis S.p.A., non fibrillating PTFE in the form of white free-flowing powder
Antioxidants and process-stabilizing agents available from Ciba.

Fabrication of Illustrative Bilayer Structures (L1*-L2*), (L1*-L2*)', (L1*-L2*)" and Comparative bilayer structure (L1*-A2)'

EXAMPLE 1

(L1*-L2*)

Non-electrically conductive bilayer structure (L1*-L2*) was fabricated by co-extrusion of unfilled polymer compositions (C1*) with physical blend (B2*) 5/95

A) Preparation of Unfilled Polymer Composition (C1*).

IXEF® PMXD6 was submitted to solid state polymerization treatment in order to increase its molecular weight. An oil-jacketed vessel with internal rotating screws was charged with 40 lbs poly(meta-xylylene adipamide) polymer pellets. After charging and closing the reactor, the screw rotation was set to 24 rpm. The reactor was purged with $N_2$. After several hours of nitrogen sparging, the side port plug of the exit vent was removed for the addition of 65 ml of water and then replaced. While keeping $N_2$ purge, the oil heater set point was set to 121° C. The oil was held at 121° C. for one hour and then the set point was changed to 204° C. After the internal pellet temperate reached 150° C., heating of the oil was continued for 4 hours, as shown in Table 1. The pellets were allowed to cool down under nitrogen before the reactor was opened. The starting and final pellet properties are described in Table 2.

TABLE 1

| Solid polymerization process parameters | | | |
|---|---|---|---|
| Elapsed Time | Measured Temp (° C.) | | Oil Set |
| (min) | Oil | Pellets | Point (° C.) |
| 7 | 86 | 43 | 121 |
| 22 | 248 | 88 | 121 |
| 27 | 250 | 93 | 121 |
| 77 | 250 | 114 | 121 |
| 90 | 169 | 129 | 204 |
| 98 | 194 | 150 | 204 |
| 202 | 204 | 193 | 204 |
| 332 | 206 | 194 | 204 |

TABLE 2

Number average molecular weight (Mn) of poly(meta-xylylenediamine) polymer before (IXEF ® PMXD6) and after (PMXD6*) solid state polymerization treatment

| Poly(meta-xylylenediamine) polymer | COOH | NH2 | Estimated inert ends | Estimated $M_n$ |
|---|---|---|---|---|
| starting resin IXEF ® PMXD6 | 75 | 48 | ≦3 | 16,260 to 15,900 |
| product resin PMXD6* | 51 | 23 | ≦3 | 27,030 to 26,000 |

$M_n = 2 \times 10^6/\Sigma$(—COOH end groups)+(—NH2 end groups)

(—COOH end groups)=number of acid end groups in equivalents/gram of product resin (titrated with a base)
(—NH2 end groups)=number of basic end groups in equivalents/gram of product resin (titrated with an acid)

The polymer components reported in Table 3 were melt compounded in order to obtain unfilled polymer composition (C1*).

TABLE 3

| Polymer composition (C1*) | |
| --- | --- |
| Component | wt. % |
| PMXD6* | 83.5 |
| POLYMIST ® F5A PTFE | 0.5 |
| Antioxidants and process-stabilizers | 1.0 |
| Impact modifier (I1.a*) | 15 |

Melt compounding was carried out by means of a Berstorff® twin screw extruder whose operating conditions were those reported in Table 4. The off-white colored strand was dipped in cold water in order to be successfully pelletized. The as compounded pellets contained 450 ppm of moisture with a pellet density of 1.18 g/cc.

TABLE 4

Polymer composition (C1*) - Extruder[a] operating conditions and temperature settings

| Barrel Temperature (° C.) | | | | | | | Temp. (° C.) | | Screw speed | Feed rate |
| --- | --- | --- | --- | --- | --- | --- | --- | --- | --- | --- |
| #2 | #3 | #4 | #5 | #6 | #7 | #8 | Die | Adapter | (rpm) | (lbs/br) |
| 260 | 260 | 260 | 260 | 255 | 255 | 255 | 255 | 255 | 230 | 20 |

[a]Berstorff ® twin screw extruder (25 mm)

B) Preparation of Physical Blend (B2*) 5/95

Physical blend (B2*) 5/95 comprising un-functionalized polyolefin (PO2*) and functionalized polyolefin (FPO2*) was obtained by dry blending, by manual tumbling, pellets of ELTEX® B6922 N1347 (HDPE) and PRIEX® 11002 (MAH-g-HDPE) (Table 5).

TABLE 5

| Composition of physical blend (B2*)5/95 | | |
| --- | --- | --- |
| Physical blend | PRIEX ®11002 (MAH-g-HDPE) (pellets wt. %) | ELTEX ® B6922 N1347 (HDPE) (pellets wt. %) |
| (B2*)5/95 | 5 | 95 |

C) Description of the Co-Extrusion Equipment

Co-extrusion equipment was comprising:
a modular cylindrical die comprising two stacked flow distributors (SFD1, SFD2) enabling to obtain two layer tubing with an external diameter (OD) of 8 mm and an internal diameter (ID) of 6 mm (FIG. 1). The die nozzle had an OD of 16 mm and an ID of 11.5 mm. The calibrator had an ID of 8.3 mm. SFD1 was used to obtain the inner layer. SFD2 was used to obtain the outer layer.
two single screw extruders, E1 having a diameter of 20 mm and E2 having a diameter of 30 mm.

Each of the stacked flow distributors SFD1 and SFD2 was fed by one extruder. The extruder E1 was used to extrude and feed polymer composition (C1*) forming the inner layer (L1*) to the stacked flow distributor SFD1. The extruder E2 was used to extrude and feed physical blend (B2*) 5/95 forming the outer layer (L2*) to the stacked flow distributor SFD2.

The co-extrusion setup is shown in FIG. 2. The extruder E1 had three barrel temperature zones: Z1, Z2 and Z3 respectively from inlet to outlet. The extruders E2 had three barrel temperature zones: Z1, Z2 and Z3 respectively from inlet to outlet. The modular cylindrical die had four different temperature zones as shown in FIG. 3. Td1 was the temperature of the back plate. Td2 was the temperature stacked flow distributor SFD1 feeding layers (L1*); Td3 was the temperature of the stacked flow distributor SFD2 feeding layer (L2*) and Td4 was the temperature of the die tip.

D) Co-Extrusion of the Tubular Bilayer Structure (L1*-L2*) and Adhesion Tests.

Tubular bilayer structure (L1*-L2*) (tubing's OD=8 mm) was obtained by co-extruding unfilled composition (C1*) (to form layer (L1*)) and physical blend (B2*) 5/95 (to form layer (L2*)) in the co-extrusion equipment previously described using process parameters shown in Table 6. The parison of the tubular structure at the exit of the die was calibrated and cooled using a conventional system comprising a vacuum calibrator and a water spray bath also kept under vacuum.

TABLE 6

Co-extrusion process parameters for tubular bilayer structure (L1*-L2*), tubing's OD = 8 mm

| | Measure units | Value |
| --- | --- | --- |
| Temperature settings | | |
| Extruder E1 | | |
| Barrel temperatures | | |
| Zone 1 | ° C. | 240 |
| Zone 2 | ° C. | 250 |
| Zone 3 | ° C. | 250 |
| Adapter layer 1 | ° C. | 250 |
| Die inlet layer 1 | ° C. | 240 |
| Extruder E2 | | |
| Barrel temperatures | | |
| Zone 1 | ° C. | 160 |
| Zone 2 | ° C. | 220 |
| Zone 3 | ° C. | 240 |
| Adapter layer 2 | ° C. | 240 |
| Die inlet layer 2 | ° C. | 240 |
| Die | | |
| Back plate, TD1 | ° C. | 230 |
| Distributor layer 1, TD2 | ° C. | 240 |
| Distributor layer 2 + front plate, TD3 | ° C. | 240 |
| Die tip, TD4 | ° C. | 240 |

TABLE 6-continued

Co-extrusion process parameters for tubular bilayer structure (L1*-L2*), tubing's OD = 8 mm

|  | Measure units | Value |
|---|---|---|
| Throughputs and line speed | | |
| Extruder E1 | | |
| screw speed | Rpm | 20 |
| estimated throughput | Cm3/minute | ±6.3 |
|  | g/min | ±6.7 |
| Extruder E2 | | |
| screw speed | Rpm | 15 |
| estimated throughput | Cm3/minute | ±16.7 |
|  | g/min | ±15.8 |
| Total throughput | | |
| total mass rate | g/min | ±22 to 26 |
| line speed | m/min | ±1.1 to 1.3 |

Extruder E1: Collin ® 20 mm. Extruder E2: Scamex ® 30 mm.

The adhesion between unfilled (C1*) based layer (L1*) and (B2*) 5/95 based layer (L2*) was tested according to SAE J2260 (REV. November 2004, §7.13, p. 25 to 27) using four strips longitudinally cut in the tubing. The minimum and average peel strength measured for co-extruded tube is given in Table 7.

TABLE 7

Peel strength between layers (L1*) and (L2*) in co-extruded tubular bilayer structure (L1*-L2*)

| Co-extruded tubular bilayer structure (L1*-L2*) | | Peel Strength | Peel Strength | |
|---|---|---|---|---|
| Layer (L1*) (inner) | Layer (L2*) (outer) | Min (N/m) | Average (N/m) | Comments |
| Formed from composition (C1*) | Formed from physical blend (B2*)5/95 | 1.79 | 2.75 | Pass SAEJ2260 |

Example 2

(L1*-L2*)'

Electrically conductive bilayer structure (L1*-L2*)' was fabricated by co-extrusion of filled polymer compositions (C1*)' with physical blend (B2*) 10/90
A) Preparation of Filled Electrically Conductive Polymer Composition (C1*)' and Measurement of its Electric Conductivity.

Polymer composition (C1*)' was obtained by melt compounding the components shown in Table 8.

TABLE 8

Polymer composition (C1*)'

| Components | wt. % |
|---|---|
| PMXD6* | 70.00 |
| POLYMIST ® F5A PTFE | 0.50 |
| Antioxidants and process-stabilizers | 1.00 |
| Impact modifier (I1.a*) | 25.00 |
| KETJENBLACK ® EC-600JD Electrically conductive filler | 3.50 |

Melt compounding was carried out by means of a Berstorff® twin screw extruder whose operating conditions and temperature settings were those reported in Table 9.

The pellet density for as compounded pellets was 1.11 g/cc.

TABLE 9

Polymer composition (C1*)' - Extruder[a] operating conditions and temperature settings

| Barrel Temperature (° C.) | | | | | | | Temp. (° C.) | | Screw speed | Feed rate |
|---|---|---|---|---|---|---|---|---|---|---|
| #2 | #3 | #4 | #5 | #6 | #7 | #8 | Die | Adapter | (rpm) | (lbs/hr) |
| 260 | 255 | 250 | 250 | 245 | 240 | 240 | 255 | 250 | 230 | 20 |

[a]Berstorff ® twin screw extruder (25 mm)

The electric conductivity of polymer composition (C1*)' was measured as follows.

A film (thickness 100 μm) of polymer composition (C1*)' was extruded on EGAN® single screw extruder with a compression ratio of 3, and L/D of 20. Prior to the film extrusion, compounded pellets of composition (C1*)' were dried to ensure moisture below 400 ppm. Extruder settings are summarized in Table 10.

TABLE 10

Extrusion of a thin film of polymer composition (C1*)' - Extruder settings

| Temperature Set Point (° C.) | | | | | | | | Screw |
|---|---|---|---|---|---|---|---|---|
| #1 | #2 | #3 | #4 | AB | AD | Die | Roller | RPM |
| 254 | 254 | 254 | 232 | 260 | 232 | 260 | 110 | 60 |

"AB", "AD" denotes barrel and die adapter respectively.

The film thus obtained was then cut into 3.8 cm by 8.4 cm strip, and was painted with two silver strips 29 mm apart and 38 mm in length. The resistance across the width of the strip was measured by a Fluke® 77 μl, and surface resistivity (Rs) was computed according to SAE J1645 (REV. January 1999, Issued 1994-02):

$$R_s = \frac{R \cdot d}{f}$$

where R is the resistance of a surface with width d and length f and $R_s$ is the surface resistivity. Results are given in Table 11.

TABLE 11

Resistance (R) and surface resistivity (Rs) of (C1*)' film in flow and transverse directions.

| Width (mm) | Length (mm) | $R_{flow}$ (ohms) | $R_{s,flow}$ (ohms/sq) | $R_{trans}$ (kilo-ohms) | $R_{s,trans}$ (ohms/sq) |
|---|---|---|---|---|---|
| 29 | 38 | 46,340 | 3.5E+04 | 64,580 | 4.9E+04 |

B) Preparation of Physical Blend (B2*) 10/90

Physical blend (B2*) 10/90 comprising un-functionalized polyolefin (PO2*) and functionalized polyolefin (FPO2*) was obtained by dry blending, by manual tumbling, pellets of ELTEX® B4922 N1347 (HDPE) and PRIEX® 11002 (MAH-g-HDPE) (Table 12)

TABLE 12

Composition of physical blend (B2*)10/90

| Physical blend | PRIEX ®11002 (MAH-g-HDPE) (pellets wt. %) | ELTEX ® B6922 N1347 (HDPE) (pellets wt. %) |
|---|---|---|
| (B2*)10/90 | 10 | 90 |

C) Description of the Co-Extrusion Equipment

Co-extrusion equipment was the same of Example 1.

D) Co-Extrusion of the Tubular Bilayer Structure (L1*-L2*)' and Adhesion Tests.

Tubular bilayer structure (L1*-L2*)' (tubing's OD=8 mm) was obtained by co-extruding unfilled composition (C1*)' (to form layer (L1*)') and physical blend (B2*)$_{10/90}$ (to form layer (L2*)) in the co-extrusion equipment previously described using process parameters shown in Table 13.

TABLE 13

Co-extrusion process parameters for tubular bilayer structure (L1*-L2*)', tubing's OD = 8 mm

|  | Measure units | Value |
|---|---|---|
| Temperature settings | | |
| Extruder E1 Barrel temperatures | | |
| Zone 1 | ° C. | 240 |
| Zone 2 | ° C. | 250 |
| Zone 3 | ° C. | 250 |
| Adapter layer 1 | ° C. | 250 |
| Die inlet layer 1 | ° C. | 240 |
| Extruder E2 Barrel temperatures | | |
| Zone 1 | ° C. | 160 |
| Zone 2 | ° C. | 220 |
| Zone 3 | ° C. | 240 |
| Adapter layer 2 | ° C. | 240 |
| Die inlet layer 2 | ° C. | 240 |
| Die | | |
| Back plate, TD1 | ° C. | 240 |
| Distributor layer 1, TD2 | ° C. | 240 |
| Distributor layer 2 + front plate, TD3 | ° C. | 240 |
| Die tip, TD4 | ° C. | 240 |
| Throughputs and line speed | | |
| Extruder E1 | | |
| screw speed | Rpm | 20 to 30 |
| estimated throughput | cm3/minute | ±6.3 to ±9.5 |
|  | g/min | ±6.7 to ±10.0 |
| Extruder E2 | | |
| screw speed | Rpm | 20 |
| estimated throughput | cm3/minute | ±33.3 |
|  | g/min | ±31.7 |
| Total throughput | | |
| total mass rate | g/min | ±38 to ±40 |
| line speed | m/min | ±1.6 to ±1.8 |

Extruder E1: Collin ® 20 mm. Extruder E2: Collin ® 30 mm.

The adhesion between layer (L1*)' and layer (L2*) was tested as previously described. The minimum and average peel strength measured for co-extruded tube is given in Table 14.

TABLE 14

Peel strength between layers (L1*)' and (L2*) in co-extruded tubular bilayer structure (L1*-L2*)'

| Co-extruded tubular bilayer structure (L1*-L2*)' | | Peel Strength | Peel Strength | |
|---|---|---|---|---|
| Layer (L1*)' (inner) | Layer (L2*) (outer) | Min (N/m) | Average (N/m) | Comments |
| Formed from filled composition (C1*)' | Formed from physical blend (B2*) 10/90 | 1.67 | 2.12 | Pass SAEJ2260 |

Example 3

(L1*-L2*)"

The procedures of example 2 were repeated under similar operating conditions as described in this example, except that Impact modifier (I1.a*) in polymer composition (C1*)' (product FUSABOND® E MB226 DE) was replaced by an equivalent weight amount of Impact modifier (I1.b*) (product EXXELOR® VA 1201 E). Resistance (R) and surface resistivity (Rs) of obtained (C1*)" film, in flow and transverse directions, were close to those of (C1*)' film in example 2. Peel strength between layers (L1*)" and (L2*) in co-extruded tubular bilayer structure (L1*-L2*)" obtained in accordance with the present example was also comparable to the same property in the co-extruded tubular bilayer structure (L1*-L2*)' of example 2.

Comparative Example C2

(L1*-Λ2)'

For comparative purposes, a tubular bilayer structure (L1*-Λ2)' (tubing's OD=8 mm) was also obtained by co-extruding filled composition (C1*)' (to form inner layer (L1*)') with pellets of ELTEX® B6922 N1347 (to form outer layer (Λ2)). Co-extrusion equipment and process parameters were the same of Example 2. In this case there was no adhesion between layer (L1*)' and layer (Λ2) (Table 15).

TABLE 15

Peel strength between layers (L1*)' and (Λ2) in
co-extruded tubular bilayer structure (L1*-Λ2)'

| Co-extruded tubular bilayer structure (L1*-Λ2)' | | Peel Strength Min (N/m) | Peel Strength Max (N/m) | Comments |
|---|---|---|---|---|
| Layer (L1*)' (inner) | Layer (Λ2) (outer) | | | |
| Formed from filled composition (C1*)' | Formed from ELTEX ® B6922 N1347 HDPE | 0 | 0 | No adhesion |

Fuel Permeation Resistance of Unfilled (C1*) and Filled (C1*)' Extruded Films

The fuel permeation of thin films obtained from unfilled polymer composition (C1)* or filled polymer composition (C1*)' was measured in CE10 fuel (45% iso-octane, 45% toluene, 10% ethanol) at 60° C. Samples were placed in heated cell where one side was exposed to permeant, the other side of the sample was swept with helium which flowed into an ionization detector to measure the composition of the gas phase. Film samples had thickness of 100±10 μm and were prepared on the EGAN® single screw extruder of Example 2. Film samples were packaged in moisture proof sealed bags before being soaked in CE10 fuel. Permeation results are summarized in Table 16.

TABLE 16

Permeation results in CE10 at 60° C.

| Film (thickness, 50 ± 5 μm) | Ethanol permeation g · mm/(m² · day) | Iso-octane permeation g · mm/(m² · day) | Toluene permeation g · mm/(m² · day) |
|---|---|---|---|
| Composition (C1*) | 0.50 | <0.001 | 0.001 |
| Composition (C1*)' | 0.89 | 0.026 | 0.26 |

The invention claimed is:

1. A multilayer structure comprising at least one couple (L1-L2) of adjacent layers (L1) and (L2), wherein:
   the layer (L1) comprises at least one polymer composition (C1) comprising: (i) at least one semi-aromatic polyamide, and (ii) at least one impact modifier (I1); and
   the layer (L2) comprises at least one polymer composition (C2) comprising: (i) at least one un-functionalized polyolefin (PO2); and (ii) at least one functionalized polyolefin (FPO2).

2. The multilayer structure according to claim 1, wherein the layer (L1) consists essentially of the polymer composition (C1), and wherein the layer (L2) consists essentially of the polymer composition (C2).

3. The multilayer structure according to claim 1, wherein the semi-aromatic polyamide is a PMXDA comprising at least 90 mole % of recurring units obtained by condensation reaction of adipic acid and meta-xylylene diamine.

4. The multilayer structure according to claim 1, wherein the semi-aromatic polyamide is a polyphthalamide.

5. The multilayer structure according to claim 1, wherein the un-functionalized polyolefin (PO2) comprises at least 70 mole % of ethylene recurring units based on the total number of moles of recurring units, and wherein the un-functionalized polyolefin (PO2) has a standard density of at least 930 kg/m³ and a melt flow index, MI5, of at most 5.0 g/10 min.

6. The multilayer structure according to claim 1, wherein the functionalized polyolefin (FPO2) comprises functional groups selected from the group consisting of carboxylic groups, their esters, their anhydrides, and their salts.

7. A process for manufacturing the multilayer structure according to claim 1, said process comprising:
   co-extruding or co-blowmolding (j) the polymer composition (C1), (jj) the polymer composition (C2), so as to obtain a couple (L1-L2) of adjacent layers (L1) and (L2).

8. The multilayer structure according to claim 1, which is a bilayer structure comprising, as sole layers, the layer (L1) and the layer (L2).

9. The multilayer structure according to claim 8, which is a hollow body or a part thereof, and wherein the layer (L1) is more inner than the layer (L2).

10. The multilayer structure according to claim 1, wherein the impact modifier (I1) is a functionalized polyolefin (FPO1) comprising functional groups selected from the group consisting of carboxylic groups, their esters, their anhydrides and their salts, and wherein said functionalized polyolefin (FPO1) is obtained by grafting at least one grafting agent (G1) onto an un-functionalized polyolefin (PO1').

11. The multilayer structure according to claim 10, wherein the functionalized polyolefin (FPO1) is obtained by grafting maleic anhydride onto a copolymer of ethylene with an α-olefin selected from the group consisting of propylene and octene, the weight of the grafted maleic anyhdride to the weight of the copolymer being of at least 0.1%.

12. The multilayer structure according to claim 1, wherein the polymer composition (C1) further comprises an electrically conductive filler, with a weight percent of said electrically conductive filler to the total weight of the polymer composition (C1) being of at least 1 wt. % and of at most 25 wt. %.

13. The multilayer structure according to claim 12, wherein the electrically conductive filler is selected from the group consisting of carbon powder, carbon black, carbon nano-tubes and mixtures thereof.

14. The multilayer structure according to claim 12, wherein:
   the weight percent of the semi-aromatic polyamide to the total weight of the polymer composition (C1) is of at least 60 wt. %;
   the weight percent of the impact modifier (I1) to the total weight of the polymer composition (C1) is of at least 15 wt. %;
   the weight percent of the un-functionalized polyolefin (PO2) to the total weight of the polymer composition (C2) is of at least 85 wt. %; and
   the weight percent of the functionalized polyolefin (FPO2) to the total weight of the polymer composition (C2) is of at least 5 wt. %.

15. The multilayer structure according to claim 1, wherein the polymer composition (C1) is free from an electrically conductive filler.

16. The multilayer structure according to claim 15, wherein:
   the weight percent of the semi-aromatic polyamide to the total weight of the polymer composition (C1) is of at least 75 wt. %;
   the weight percent of the impact modifier (I1) to the total weight of the polymer composition (C1) is of at least 10 wt. %;
   the weight percent of the un-functionalized polyolefin (PO2) to the total weight of the polymer composition (C2) is more than 90 wt. %; and the weight percent of the functionalized polyolefin (FPO2) to the total weight of the polymer composition (C2) is of at least 2 wt. %.

17. The multilayer structure according to claim 1, wherein the polymer composition (C2) comprises a regrind of one of the layers (L1) and (L2), or a regrind of both layers (L1) and (L2).

18. The multilayer structure according to claim 17, wherein the weight percent of the regrind to the total weight of the polymer composition (C2) is of at least 10 wt. % and of at most 60 wt. %.

19. A shaped article comprising the multilayer structure according to claim 1.

20. The shaped article according to claim 19, which is a hollow body selected from the group consisting of pipes, hoses, tubes, containers, fuel tanks, and bottles.

21. A hose, the inner part of which is contacted with fuel, said hose being a bilayer structure comprising, as sole layers, one couple (L1-L2) of adjacent layers (L1) and (L2), the layer (L1) being more inner than the layer (L2), wherein:
the layer (L1) consists essentially of a polymer composition (C1) comprising: (i) at least one semi-aromatic polyamide, and (ii) at least one impact modifier (I1); and
the layer (L2) consists essentially of a polymer composition (C2) comprising: (i) at least one un-functionalized polyolefin (PO2); and (ii) at least one functionalized polyolefin (FPO2).

22. The hose according to claim 21, wherein:
the semi-aromatic polyamide is a PMXDA comprises at least 90 mole % of recurring units obtained by condensation reaction of adipic acid and meta-xylylene diamine;
the impact modifier (I1) is a functionalized polyolefin (FPO1) comprising functional groups selected from the group consisting of carboxylic groups, their esters, their anhydrides, and their salts, said functionalized polyolefin (FPO1) being obtained by grafting at least one grafting agent (G1) onto an un-functionalized polyolefin (PO1'); and
the functionalized polyolefin (FPO2) comprises functional groups selected from the group consisting of carboxylic groups, their esters, their anhydrides, and their salts.

23. The hose according to claim 21, wherein:
the polymer composition (C1) further comprises an electrically conductive filler, the weight percent of said electrically conductive filler to the total weight of the polymer composition (C1) being of at least 1 wt. %;
the weight percent of the semi-aromatic polyamide to the total weight of the polymer composition (C1) is of at least 60 wt. %;
the weight percent of the impact modifier (I1) to the total weight of the polymer composition (C1) is of at least 15 wt. %;
the weight percent of the un-functionalized polyolefin (PO2) to the total weight of the polymer composition (C2) is of at least 85 wt. %; and
the weight percent of the functionalized polyolefin (FPO2) to the total weight of the polymer composition (C2) is of at least 5 wt. %.

24. The multilayer structure according to claim 21, wherein:
the polymer composition (C1) is free from an electrically conductive filler;
the weight percent of the semi-aromatic polyamide to the total weight of the polymer composition (C1) is of at least 75 wt. %;
the weight percent of the impact modifier (I1) to the total weight of the polymer composition (C1) is of at least 10 wt. %;
the weight percent of the un-functionalized polyolefin (PO2) to the total weight of the polymer composition (C2) is more than 90 wt. %; and
the weight percent of the functionalized polyolefin (FPO2) to the total weight of the polymer composition (C2) is of at least 2 wt. %.

* * * * *